(12) United States Patent
Jiang et al.

(10) Patent No.: US 10,858,724 B2
(45) Date of Patent: Dec. 8, 2020

(54) METHOD FOR HOMOGENIZING THE COMPOSITIONS AND MECHANICAL PERFORMANCES OF NICKEL-BASED MATERIAL BRAZED JOINTS

(71) Applicant: China University of Petroleum (East China), Qingdao (CN)

(72) Inventors: Wenchun Jiang, Qingdao (CN); Shandong Tu, Qingdao (CN); Lei Ge, Qingdao (CN); Chaohe Yang, Qingdao (CN); Xiang Ling, Qingdao (CN); Jianming Gong, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 260 days.

(21) Appl. No.: 16/096,799

(22) PCT Filed: Jan. 15, 2018

(86) PCT No.: PCT/CN2018/072536
§ 371 (c)(1),
(2) Date: Oct. 26, 2018

(87) PCT Pub. No.: WO2018/188398
PCT Pub. Date: Oct. 18, 2018

(65) Prior Publication Data
US 2020/0325566 A1    Oct. 15, 2020

(30) Foreign Application Priority Data
Apr. 13, 2017 (CN) .......................... 2017 1 0238526

(51) Int. Cl.
*C22F 1/10* (2006.01)
*C22F 1/02* (2006.01)
(Continued)

(52) U.S. Cl.
CPC .............. *C22F 1/10* (2013.01); *B23K 35/304* (2013.01); *C22C 19/058* (2013.01); *C22F 1/02* (2013.01)

(58) Field of Classification Search
None
See application file for complete search history.

(56) References Cited

U.S. PATENT DOCUMENTS 5,916,384 A * 6/1999 Das .......................... B23P 15/04
  148/522
2015/0217412 A1   8/2015 Liu et al.
2015/0368774 A1* 12/2015 Ota .......................... F23R 3/002
  60/752

FOREIGN PATENT DOCUMENTS

CN       101486135 A      7/2009
CN       103276332 A      9/2013
(Continued)

OTHER PUBLICATIONS

International Search Report (PCT/ISA/210) dated Apr. 4, 2018, by the State Intellectual Property Office of the P.R. China as the International Searching Authority for International Application No. PCT/CN2018/072536.

(Continued)

*Primary Examiner* — Brian D Walck
(74) *Attorney, Agent, or Firm* — Buchanan Ingersoll & Rooney PC

(57) ABSTRACT

A method for homogenizing the compositions and mechanical performances of nickel-based material brazed joints, includes three homogenized manufacturing steps: Step I, assembling the welding sample, placing it into the vacuum furnace, and then heating up to 830~860° C. and holding the temperature; then heating up again to 1050~1100° C. and holding the temperature; allowing for slow self-cooling in vacuum till it reaches 620~640° C.; then filling the furnace (Continued)

with nitrogen and starting the vacuum furnace fan at the same time, so that the sample is cooled down to 40~60° C.; Step II, raising the temperature up to 1140~1160° C. and holding, then cooling it down to the room temperature through water-quenching; Step III, raising the temperature of the welding sample up to 680~750° C. again, and cooling it down to the room temperature through air cooling.

3 Claims, 1 Drawing Sheet

(51) Int. Cl.
    *C22C 19/05*     (2006.01)
    *B23K 35/30*     (2006.01)

(56) References Cited

FOREIGN PATENT DOCUMENTS

| | | |
|---|---|---|
| CN | 105925925 A | 9/2016 |
| CN | 106078108 A | 11/2016 |
| CN | 106112167 A | 11/2016 |
| CN | 106222457 A | 12/2016 |
| CN | 106914673 A | 7/2017 |

OTHER PUBLICATIONS

Written Opinion (PCT/ISA/237) dated Apr. 4, 2018, by the State Intellectual Property Office of the P.R. China as the International Searching Authority for International Application No. PCT/CN2018/072536.

Notice of the Opinion on the First Examination dated Apr. 2, 2018 by the State Intellectual Property Office of the People's Republic of China in corresponding Chinese Patent Application No. 201710238526.7 and an English translation of the Notice. (13 pages).

Notification to Grant Patent Right for Invention dated Jun. 5, 2018 by State Intellectual Property Office of the People's Republic of China in corresponding Chinese Patent Application No. 201710238526.7. (1 page).

Jiang et al., "Effect of holding time on vacuum brazing for a 304 stainless steel plate-fin structure," Machinery Design & Manufacture, (Nov. 2010), No. 11, pp. 79-81 and an English translation thereof. (9 pages).

Huang et al., "Boron brittle phase morphology and its elimination method in nickel-base alloy brazed joints," Aeronautical Materials, (1984), No. 2, pp. 26-30 and an English abstract thereof. (6 pages).

* cited by examiner

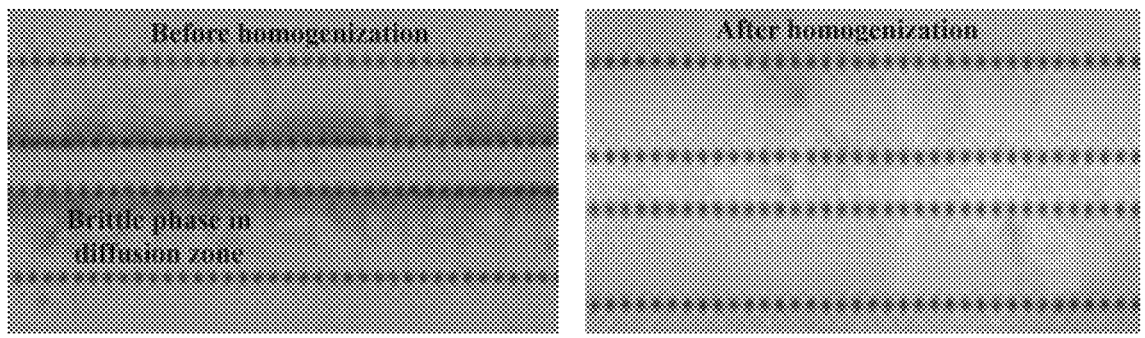

METHOD FOR HOMOGENIZING THE COMPOSITIONS AND MECHANICAL PERFORMANCES OF NICKEL-BASED MATERIAL BRAZED JOINTS

TECHNICAL FIELD

The invention relates to a method for homogenizing the compositions and mechanical performances of nickel-based material brazed joints, which belongs to the welding field.

BACKGROUND

Plate-fin heat exchangers are characterized by compact structure, high heat transfer efficiency, light weight and sturdiness, adaptability and cost performance, and thus are widely applied in petrochemical, power machinery, atomic energy, defense industry, etc. Aluminum plate-fin heat exchangers cannot withstand high pressure or temperature. Therefore, plate-fin heat exchangers to be used in high-temperature, high-pressure and corrosive medium environments shall be made of nickel-based super alloy material which is able to bear high temperature and corrosion.

Plate-fin heat exchangers are fabricated by means of vacuum brazing. However, the strength of currently available brazed joints cannot yet provide long-cycle reliable operation in the heat and high pressure as required in the new era. The main reasons are: first, the joint has poor strength and ductility. Even that the metal at brazing seams completely generates solid solution, under high temperature the failure locations are still located at the brazing seams, so that the joint strength and ductility is much lower than those of the base metal. How to improve the mechanical properties and ductility of the joint becomes a problem to be tackled urgently. Second, element B in the intermediate region of the joint is not adequately diffused, so that brittle compounds are generated. The brazing process shall be optimized so that solid solution is thoroughly produced in the intermediate region of the joint. To solve the above-mentioned problems, strong measures shall be taken, provided that complete isothermal solidification is achieved in the intermediate region of the joint, to further enhance the mechanical performances of the joint.

SUMMARY

To solve the above technical problems, the present disclosure provides a method for homogenizing the compositions and mechanical performances of nickel-based material brazed joints.

The disclosure offers a technical solution which is:

A method for homogenizing the compositions and mechanical performances of nickel-based material brazed joints, which consists of the steps below:

Step I: Assemble the welding sample properly and put it into the vacuum furnace; first heat up to 830~860° C. at the rate of 13~16° C./min., and hold the temperature for 30~40 min.; then heat up to 1050~1100° C. at the rate of 7~10° C./min. and hold the temperature for 25~40 min.; allow for slow self-cooling in vacuum till it reaches 620~640° C.; then fill the vacuum furnace with nitrogen and start the vacuum furnace fan at the same time, so that the sample is cooled down to 40~60° C.;

Step II: Raise the temperature of the processed welding sample up to 1140~1160° C. and hold the temperature for 11~12 h, and then cool it down to the room temperature through water-quenching;

Step III: Raise the temperature of the processed welding sample up to 680~750° C., hold the temperature for 17~19 h, and cool it down to the room temperature through air cooling.

Preferably, the above-described welding sample, prior to being assembled, has its base part surfaces subject to grinding and polishing, and then acid pickling, alkaline washing, ultrasonic hot water cleaning and acetone washing successively.

Preferably, the above-described welding sample is made of nickel-based super alloy material, with In718 or In625 more preferably.

Preferably, in Step I the described vacuum furnace is vacuumed to $1\times10^{-3}$ Pa.

Technical benefits of the disclosure:

The disclosure offers a three-step homogenization process which removes borides from the intermediate zone and diffusion zone at the joints, homogenizes the chemical compositions of the joint and base metal, improves the consistency between mechanical properties of the joint and the base metal, reduces the residual stress, and enhances the hot strength of brazed joints. It lays the foundation for achieving the long-cycle reliable operation of plate-fin heat exchangers in the heat, and meets the service requirements under higher temperature and pressure in the new age.

BRIEF DESCRIPTION OF DRAWINGS

FIG. 1 shows the distribution of joint regions on the welding sample before and after homogenization.

DETAILED DESCRIPTION

The welding sample is made of In718, In625 or any other nickel-based super alloy material, which contains Ni, Cr, Mo, Nb, Ti, Al, etc. The brazing material shall be BNi2, with a thickness of 45~60 μm, containing B, Ni, Cr and so on.

The method for homogenizing the compositions and mechanical performances of nickel-based material brazed joints comprises the following steps:

Step I: First process the base part surfaces through grinding and polishing, followed with acid pickling, alkaline washing, ultrasonic hot water cleaning and acetone washing successively. Then assemble the sample, and vacuum the vacuum furnace to $1\times10^{-3}$ Pa.

Put the assembled welding sample into the vacuum furnace; first heat up to 830~860° C. at the rate of 13~16° C./min., and hold the temperature for 30~40 min.; then heat up to 1050~1100° C. at the rate of 7~10° C./min. and hold the temperature for 25~40 min.; allow for slow self-cooling in vacuum till it drops to 620~640° C. from the brazing temperature; then fill the vacuum furnace with nitrogen and start the vacuum furnace fan at the same time, so that the sample is cooled down to 40~60° C. and then taken out of the furnace.

This step produces complete solid solution in the brazed joints, so as to eliminate the joint intermediate region, i.e., to remove the borides from the solidified zone of borides, resulting in a relatively strong structure.

Step II: Raise the temperature of the processed welding sample up to 1140~1160° C. at the rate of 15~20° C./min. and hold the temperature for 11~12 h; then cool it down to the room temperature via water-quenching;

This step is to decompose the borides of the diffusion zone so that they diffuse to the braze metal and vanish, and to facilitate the diffusion of Nb, Al, Ti and Cr from the braze metal to the brazing seam and enable alloying; by maintaining the temperature for an appropriate time, the chemical compositions of the brazing seam and the braze metal become homogenized, so that the temperature-resistance of joints is enhanced.

Step III: Raise the temperature of the processed welding sample up to 680~750° C. at the rate of 12~15° C./min, hold the temperature for 17~19 h, and cool it down to the room temperature through air cooling.

This step is to produce γ″ and γ′ phases so that the mechanical properties are further improved.

In the homogenization process in Step II and Step III, B diffuses to the base metal in long range, gets diluted and dissolved in the base metal, improving the mechanical properties.

The three-step homogenization process removes borides from the intermediate zone and diffusion zone at the joints, homogenizes the chemical compositions of the joint and base metal, improves the consistency between mechanical properties of the joint and the base metal, reduces the residual stress, and enhances the high temperature strength of brazed joints. It lays the foundation for achieving the long-cycle reliable operation of plate-fin heat exchangers in the high temperature environment.

FIG. 1 shows the distribution of joint regions before and after homogenization, which can be observed with SEM. The FIGURE shows that, before homogenization, the distribution of borides in the joint's diffusion zone is obvious; after homogenization, these borides are removed, and mechanical properties of the joint and the base metal are homogenized, with the joint's mechanical properties improved.

Table 1 lists the lasting performances of the base metal at 650° C., of the non-homogenized joint and the homogenized joint respectively.

TABLE 1

| Category | Index | |
|---|---|---|
| | Time to rupture (h) | Elongation at rupture (%) |
| Base Metal | 39 | 22 |
| Non-homogenized joint | 7 | 4 |
| Homogenized joint | 36 | 8 |

From Table 1 it can be seen that the joint's stress-rupture performances are significantly improved after homogenization provided by this disclosure.

Table 2 shows the chemical compositions of the joint's isothermal solidification zone (at. %).

TABLE 2

| Stage/zone | | Element | | | |
|---|---|---|---|---|---|
| | | Ni | Cr | No | Nb + Al + Ti |
| Before homogenization | Solidified zone | 69 | 11.8 | 0 | 0 |
| | Base metal | 46.2 | 18.2 | 3.1 | 6.4 |
| After homogenization | Solidified zone | 54 | 19 | 1.8 | 5.5 |
| | Base metal | 51 | 17 | 2.1 | 5.9 |

From Table 2 it can be seen that after the homogenization provided by this disclosure, the chemical composition contents in the joint and base metal changes substantially and become homogenized.

What is claimed is:

1. A method for homogenizing the compositions and mechanical performances of a nickel-based material brazed joint, the method comprising steps below:

Step I: assembling a welding sample and placing the welding sample into a vacuum furnace; first heating up to 830~860° C. at a rate of 13~16° C./min., and holding the temperature for 30~40 min.; then heating up to 1050~1100° C. at a rate of 7~10° C./min. and holding the temperature for 25~40 min.; allowing for self-cooling in vacuum till the temperature of the sample reaches 620~640° C.; then filling the vacuum furnace with nitrogen and starting a vacuum furnace fan at the same time, so that the sample is cooled down to 40~60° C.;

Step II: raising the temperature of the processed welding sample of Step I up to 1140~1160° C. and holding the temperature for 11~12 h, and then cooling down to a room temperature through water-quenching;

Step III: raising the temperature of the processed welding sample of Step II up to 680~750° C., holding the temperature for 17~19 h, and cooling down to the room temperature through air cooling.

2. The method for homogenizing the composition and mechanical performance of a nickel-based material brazed joint as described in claim 1, wherein the welding sample is made of a nickel-based super alloy material.

3. The method for homogenizing the composition and mechanical performance of a nickel-based material brazed joint as described in claim 1, wherein in Step I, the vacuum furnace is vacuumed to $1 \times 10^{-3}$ Pa.

* * * * *